United States Patent

Watari et al.

[11] Patent Number: 5,980,081
[45] Date of Patent: Nov. 9, 1999

[54] CONTROL SYSTEM HAVING EFFECTIVE ERROR DETECTION CAPABILITIES

[75] Inventors: Daisuke Watari, Kariya; Sanae Hirata, Okazaki, both of Japan

[73] Assignee: Denso Corporation, Kariya, Japan

[21] Appl. No.: 08/892,125

[22] Filed: Jul. 14, 1997

[30] Foreign Application Priority Data

Jul. 15, 1996 [JP] Japan ..................................... 8-185092
Mar. 25, 1997 [JP] Japan ..................................... 9-071773

[51] Int. Cl.⁶ .............................. G05B 9/02; G06F 11/00
[52] U.S. Cl. ............................. 364/184; 714/736; 701/43
[58] Field of Search ..................................... 364/184–187; 395/182.08, 182.21, 182.22, 183.01, 183.07–183.09, 183.13, 183.15, 183.17, 184.01; 371/3; 701/43, 107; 714/736, 23–25, 31–33, 37, 39, 41, 47, 703, 732, 734; 324/73.1

[56] References Cited

U.S. PATENT DOCUMENTS 4,049,957  9/1977  Kera et al. .......................... 395/182.08
4,503,536  3/1985  Panzer ...................................... 714/736
5,144,230  9/1992  Katoozi et al. .......................... 324/73.1
5,157,780  10/1992  Stewart et al. ..................... 395/183.07
5,259,473  11/1993  Nishimoto ................................. 701/43

FOREIGN PATENT DOCUMENTS 5-302541  11/1993  Japan .
6-230994  8/1994  Japan .
8-161193  6/1996  Japan .

*Primary Examiner*—William Grant
*Assistant Examiner*—Steven R. Garland
*Attorney, Agent, or Firm*—Nixon & Vanderhye P.C.

[57] ABSTRACT

A monitoring process of a subordinate CPU executes a monitoring subroutine based on external data to check if a main CPU is operating properly or not. A ROM stores test input data for the monitoring subroutine and reference data that should be obtained by the monitoring subroutine based on the test input data. The subordinate CPU alternately executes the monitoring process and a logic determination process which executes the monitoring subroutine based on the test input data. When the monitoring subroutine gives results different from the reference data, the logic determination process determines that there is an abnormality in the monitoring subroutine.

13 Claims, 6 Drawing Sheets

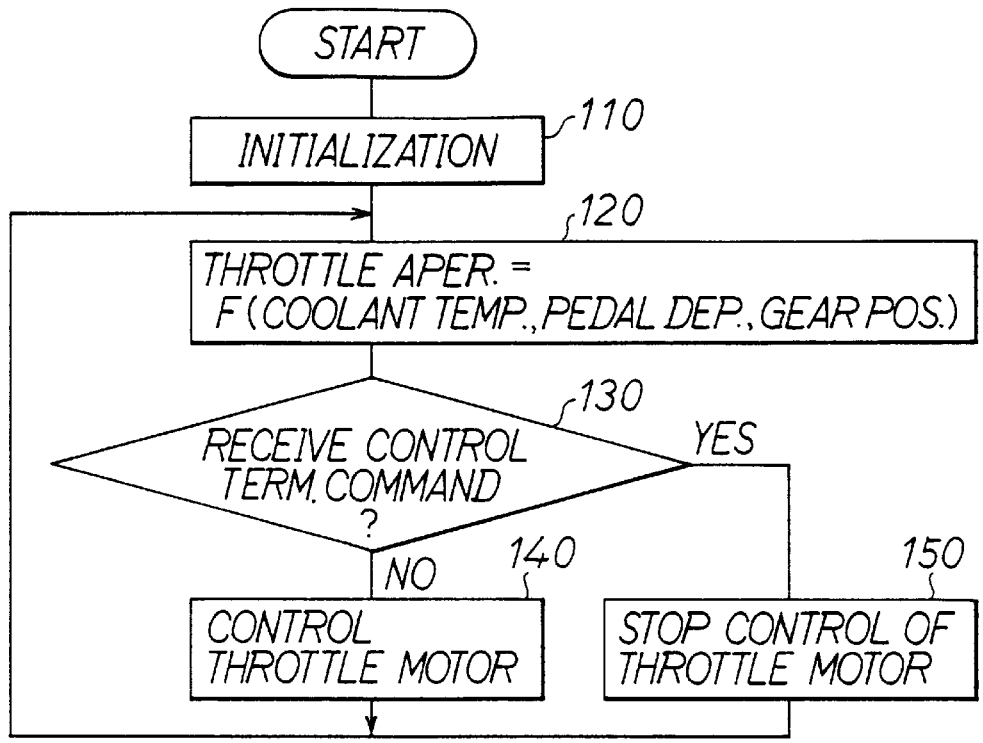
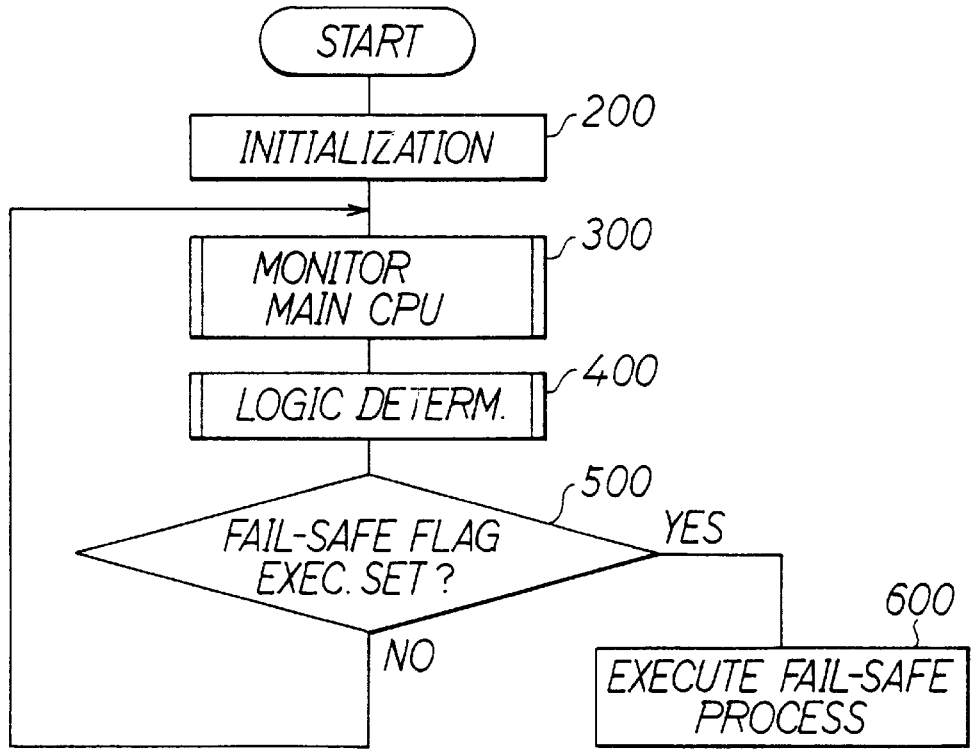

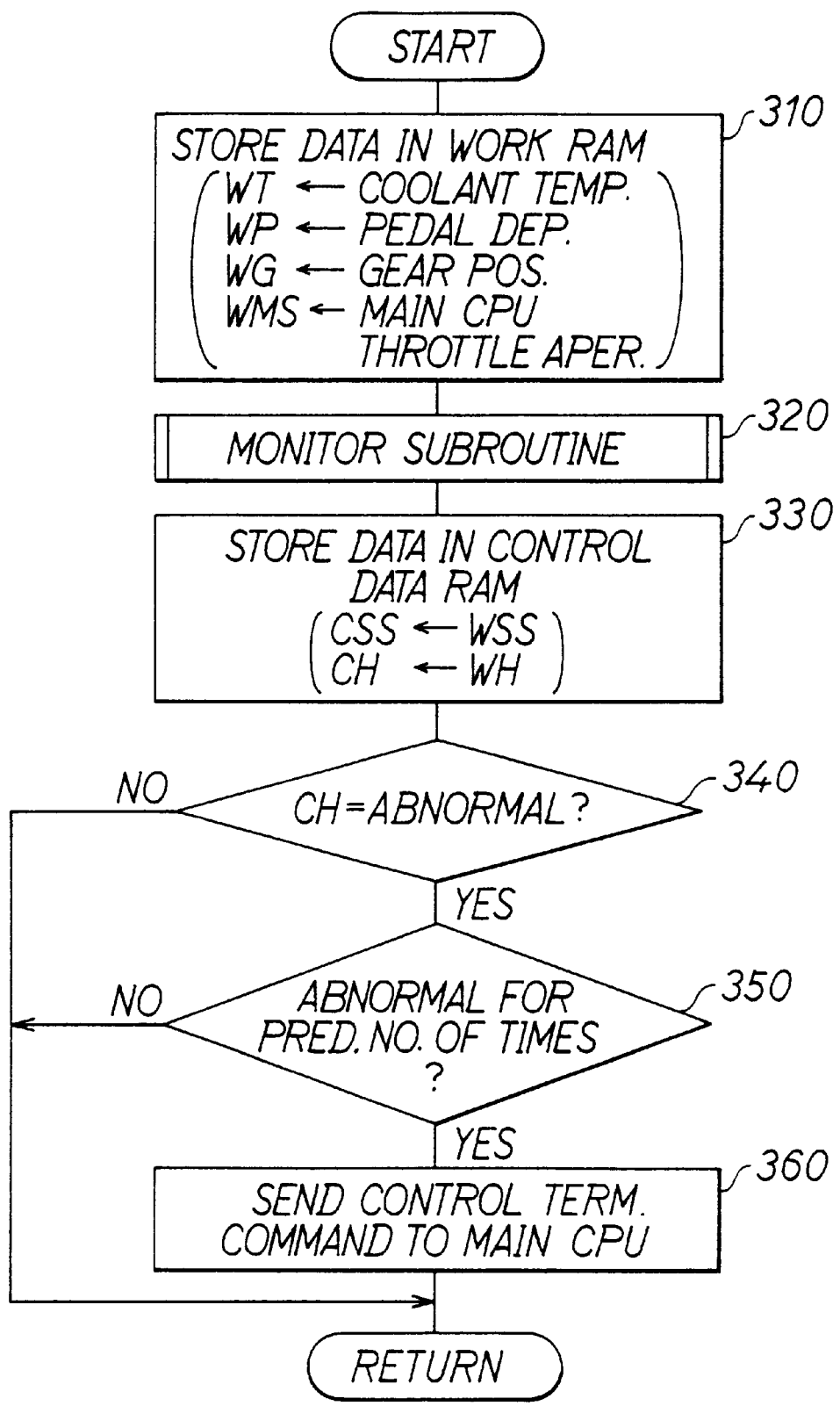

CONTROL SYSTEM HAVING EFFECTIVE ERROR DETECTION CAPABILITIES

CROSS-REFERENCE TO RELATED APPLICATIONS

This application is related to and claims priority from Japanese Patent Application No. Hei-8-185092 filed on Jul. 15, 1996 and Japanese Patent Application No. Hei-9-71773 filed on Mar. 25, 1997, the contents of which are hereby incorporated by reference.

BACKGROUND OF THE INVENTION

1. Field of the Invention

The present invention relates to a system for processing external data and for providing results of such processing to other devices.

2. Description of Related Art

Conventional electronic controllers, for example, a controller for controlling an internal combustion engine of a vehicle, are provided with a microprocessor. Such a microprocessor, which typically includes a CPU, ROM, RAM and the like, processes input data from the outside by executing predetermined processes based on programs stored beforehand in the ROM. Based on the results of the execution of the predetermined processes, this microprocessor provides control signals to output circuits to drive actuators or the like.

To ensure the proper execution of a control process for controlling a target device, after storing the control program in the ROM, conventional electronic controllers employ a checking procedure (i.e., check sum) to check if the original program and data are accurately stored in the ROM or not. However, the check sum procedure may not be able to check if the original program and data are stored accurately in the ROM or not when several errors occur during the storage of the control program and data in the ROM. Thus, the electronic controller might perform control operations based on such erroneous program and data. Moreover, such program errors may appear inconspicuous during normal control operations and thus, it will be difficult to detect such errors.

Meanwhile, the electronic controller may be further provided with a monitor circuit to check if the CPU generates watchdog signals at regular intervals or not. However, in this arrangement, the monitor circuit will only be simply monitoring the generation of watchdog signals performed by the CPU based on a separate output procedure. Thus, the monitor circuit might not be able to detect actual errors in the control program being performed by the CPU.

SUMMARY OF THE INVENTION

In view of the foregoing problems of the prior art in mind, it is a goal of the present invention to provide a system which can accurately and reliably detect errors during the execution of predetermined processes.

The above objects are achieved according to a first aspect of the present invention by providing a control system which includes a parameter data memory unit, a processing unit, an activation unit, a control unit, a signal generation unit, a test data memory unit and a check unit. The parameter data memory unit is for storing parameter data. The processing unit is for executing a predetermined process based on the parameter data stored in the parameter data memory unit. The activation unit is for receiving external data, storing the external data in the parameter data memory unit as the parameter data and activating the processing unit. The control unit is for controlling a target device based on the external data. The signal generation unit is for providing a control signal to the control unit based on a processing result of the predetermined process executed by the processing unit when the processing unit is activated by the activation unit. The test data memory unit is for storing test data. The test data includes test input data and reference data indicative of the corresponding processing result when the processing unit executes the predetermined process based on the test input data. The check unit is for reading the test data from the test data memory unit, storing the test data as the parameter data in the parameter data memory unit, activating the processing unit to execute the predetermined process based on the test input data unless the activation unit is activating the processing unit and for determining that there is an abnormality in the processing unit when the processing result of the processing unit based on the test input data is different from the reference data.

In this way, erroneous operations of the processing unit which executes the predetermined process can be reliably detected by the check unit based on the test data. Also, because the signal generation unit provides the control signal to the control unit only when the processing unit is activated by the activation unit, the signal generation unit will provide signals to the control unit based only on the external data and not on the test data.

Preferably, the parameter data memory unit is further for storing the processing result of the processing unit. Here, the parameter data memory unit includes a first memory region and a second memory region that is distinct from the first memory region. The parameter data memory unit stores the processing result of the processing unit in the first memory region when the processing unit is activated by the activation unit. The parameter data memory unit stores the processing result of the processing unit in the second memory region when the processing unit is activated by the check unit. The signal generation unit is for generating the control signal based on the processing result stored in the first memory region.

In this way, there is further assurance that the signal generation unit will provide the control signal to the control unit based only on the external data.

Preferably, the processing unit is for executing the predetermined process to monitor if there is an abnormality in the control operation of the control unit. The signal generation unit is for generating the control signal to set the control unit to an abnormal operation mode when the processing unit determines that there is an abnormality in the control operation of the control unit.

In this way, the reliability of the control operation of the control unit for controlling the target device can be further enhanced with the processing unit monitoring the operation of the control unit with the processing unit itself being monitored in turn by the check unit.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is a flow chart of a main CPU process executed by a main CPU of the engine control system in the first embodiment;

FIG. 3 is a flow chart of a subordinate CPU process executed by a subordinate CPU of the engine control system in the first embodiment;

FIG. 4 is a flow chart of a main CPU monitoring process executed by the subordinate CPU in the first embodiment;

DETAILED DESCRIPTION OF PRESENTLY PREFERRED EXEMPLARY EMBODIMENTS

Preferred embodiments of the present invention are described hereinafter with reference to the accompanying drawings.

Figure 1:
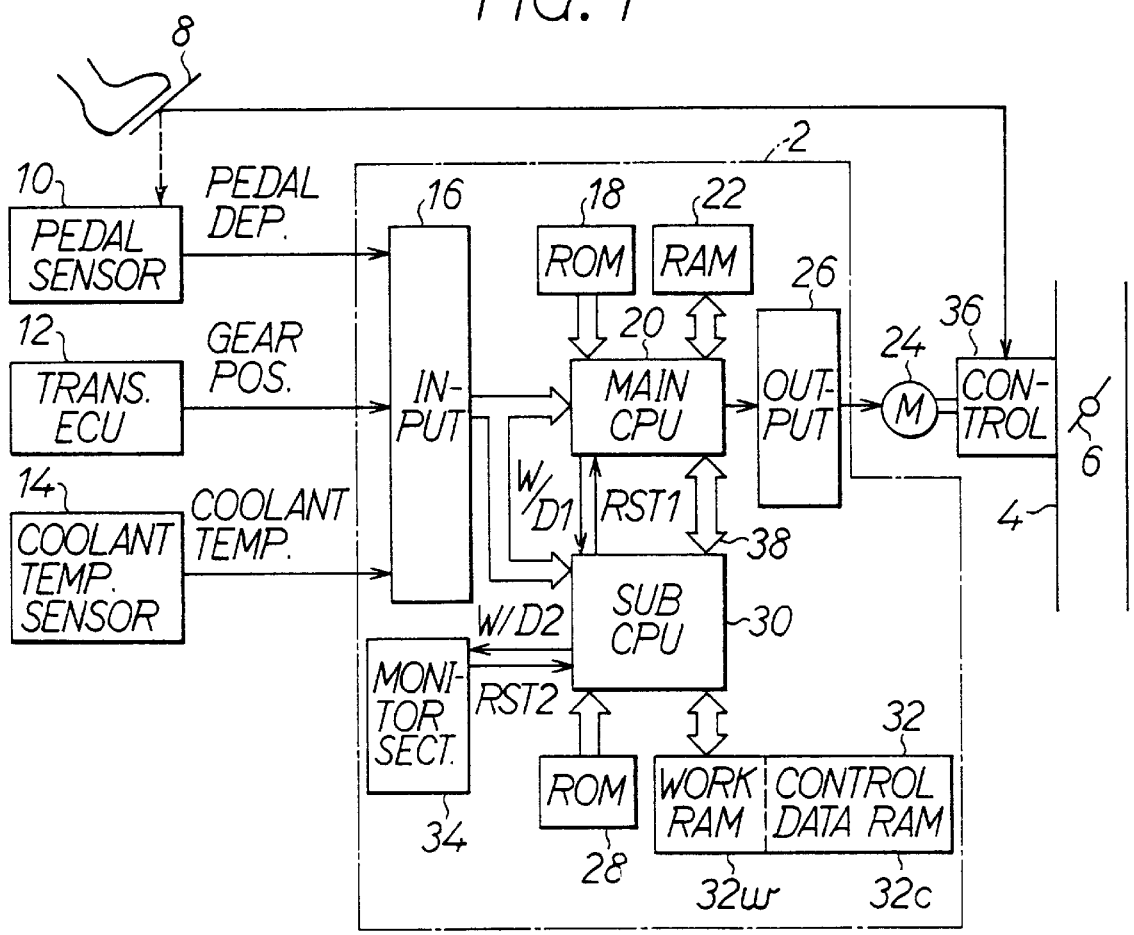
FIG. 1 is a schematic diagram of an engine control system and its peripheral devices according to a first preferred embodiment of the present invention.

In FIG. 1, a vehicular engine control system 2 (hereinafter simply referred to as "control system") according to a first preferred embodiment of the present invention controls the ignition timing of an internal combustion engine of a vehicle. While the control system 2 controls the ignition timing together with controlling a throttle valve 6 provided in an inlet air assembly 4 of the engine, explanation here will center only on control operations on the throttle valve 6.

As shown in FIG. 1, the control system 2 includes an input circuit 16. The input circuit 16 receives a depression signal from a pedal depression sensor 10 that detects an amount of depression of a gas pedal 8, a signal that indicates the gear position of an automatic transmission from a transmission ECU (electronic control unit) 12, a signal that indicates the temperature of the coolant of the internal combustion engine from a coolant sensor 14 and the like. The input circuit 16 generates digital signals based on the signals it has received.

The control system 2 further includes a ROM 18, a main CPU 20, a RAM 22 and an output circuit 26. The ROM 18 stores programs for controlling the internal combustion engine. The main CPU 20 executes various control processes for controlling the internal combustion engine based on the programs stored in the ROM 18. The RAM 22 temporarily stores results of various processes executed by the main CPU 20. The output circuit 26 drives a throttle motor 24 to adjust the aperture of the throttle valve 6 based on commands from the main CPU 20.

Moreover, the control system has an additional ROM 28, a subordinate CPU 30, an additional RAM 32 and a monitor section 34. The ROM 28 stores programs for monitoring the main CPU 20 to check if it is operating properly or not. The subordinate CPU 30 executes processes for monitoring the main CPU 20 based on the programs stored in the ROM 28. The RAM 32 temporarily stores results of processes executed by the subordinate CPU 30. The monitor section 34 monitors the subordinate CPU 30 to see if it is generating a watchdog signal W/D2 at regular intervals and provides the subordinate CPU 30 with a reset signal RS2 when the subordinate CPU 30 stops generating the watchdog signal W/D2.

In the control system 2 according to the present embodiment, following the process of flow chart of FIG. 2 which is explained later, the main CPU 20 computes the control aperture (that is, the throttle aperture) of the throttle valve 6 based on the various signals from the input circuit 16. The main CPU 20 subsequently provides command signals to the output circuit 26 in accordance with the computed throttle aperture. Consequently, the output circuit 26 actuates the throttle motor 24 which drives the aperture controller 36 to adjust the aperture of the throttle valve 6.

As is known in the art, the aperture controller 36 includes a mechanical unit for mechanically coupling the gas pedal 8 with the throttle valve 6 via wires, link mechanisms and the like and an electronic control unit for adjusting the aperture of the throttle valve 6 in accordance with the operation of the throttle motor 24. The aperture controller 36 has a safeguard function for limiting the aperture of the throttle valve 6 to be no more than the maximum aperture corresponding to the amount of depression of the gas pedal 8. In this way, the control system 2 controls the aperture of the throttle valve 6 to be within a predetermined range of the aperture value that corresponds to the amount of depression of the gas pedal 8. It must be noted that the aperture of the throttle valve 6 can be adjusted to be in accordance with the depression of the gas pedal 8 even if the control system 2 terminates control operations of the throttle valve 6.

Meanwhile, in this control system 2 according to the present embodiment, the subordinate CPU 30 also receives the same signals the input circuit 16 provides to the main CPU 20. The main CPU 20 and the subordinate CPU 30 can communicate with each other via a serial communication line 38.

The subordinate CPU 30 monitors the main CPU 20 to determine whether it is generating a watchdog signal W/D1 at regular intervals or not. If the main CPU 20 stops generating the watchdog signal W/D1, the subordinate CPU 30 continues to monitor the main CPU 20 while also executing the routine shown by the flow chart of FIG. 4 to more closely monitor the main CPU 20 to determine whether it is operating properly or not. Moreover, the subordinate CPU 30 executes a logic determination process, which is shown by the flow chart of FIG. 6 and which will be explained later, to check whether the subordinate CPU 30 itself is properly operating or not.

As shown in FIG. 1, the RAM 32, which the subordinate CPU 30 accesses during the execution of its operations, is divided into a control data RAM region 32c and a work RAM region 32w. The control data RAM region 32c stores final results of the processes executed by the subordinate CPU 30. On the other hand, the work RAM region 32w stores intermediate results of the processes executed by the subordinate CPU 30.

The processes executed by the main CPU 20 and the subordinate CPU 30 are explained hereinafter.

The main CPU 20 starts the execution of a main CPU process shown by the flow chart of FIG. 2 when an ignition switch of the vehicle is actuated. While FIG. 2 shows the repeated execution of steps 120–150, it must be noted that steps 120–150 are actually executed at predetermined time intervals.

As shown in the flow chart of FIG. 2, step 110 performs an initialization procedure for initializing all internal data of the main CPU 20. Subsequent step 120 determines the temperature of the coolant (hereinafter referred to simply as "coolant temperature") of the internal combustion engine, pedal depression and the gear position of the automatic transmission based on signals from the input circuit 16 and computes for the target throttle aperture based on the aforementioned values using a predetermined function f.

Step 130 determines if the subordinate CPU 30 has sent a control termination command via the serial communication line 38. That is, step 130 determines whether or not the control termination command has been received from the subordinate CPU 30. If step 130 gives a negative output, control goes to step 140. Step 140 provides a drive command to the output circuit 26 in accordance with the target throttle aperture computed in step 120. Step 140 controls the throttle motor 24 to set the actual aperture of the throttle valve 6 to the target throttle aperture computed in step 120. Control goes back to step 120 after step 140.

Meanwhile, if step 130 determines that the control termination signal has been received from the subordinate CPU 30, control goes to step 150 which terminates the control operations on the throttle motor 24. Control goes back to step 120 after step 150.

As explained above, the main CPU 20 computes (in step 120) the target throttle aperture based on the coolant temperature of the internal combustion engine, the pedal depression of the gas pedal 8 and the gear position of the automatic transmission. While the main CPU 20 normally controls the throttle valve 6 to set its aperture to the target throttle aperture (as is performed in step 140), if the control termination signal is received from the subordinate CPU 30 (that is, step 130 gives a positive output), the main CPU 20 stops controlling the throttle valve 6 (step 150). When the main CPU 20 stops controlling the throttle valve 6, the throttle valve 6 is placed under a special emergency operation mode in which its aperture is adjusted to correspond with the amount of depression of the gas pedal 8.

Meanwhile, through an interrupt routine that is executed at predetermined intervals, the main CPU 20 sends the throttle aperture computed in step 120 to the subordinate CPU 30 via the serial communication line 38. The main CPU 20 receives the control termination command from the subordinate CPU 30 through the same interrupt routine.

Next, the process (hereinafter referred to as "subordinate CPU process") executed by the subordinate CPU 30 is explained hereinafter with reference to FIG. 3. The subordinate CPU 30 starts to execute this process when the ignition switch is actuated. While FIG. 3 shows steps 300–500 as if the subordinate CPU 30 repetitively executes such steps at all times, the subordinate CPU 30 actually executes steps 300–500 at predetermined time intervals.

After the subordinate CPU 30 commences the execution of the subordinate CPU process, step 200 initializes all internal data inside the subordinate CPU 30. Subsequent step 300 executes the process (hereinafter referred to as "main CPU monitoring process") which is shown in the flowchart of FIG. 4 to check if the main CPU 20 is operating properly or not.

In this main CPU monitoring process shown in FIG. 4, based on the signals from the input circuit 16, step 310 detects the coolant temperature of the coolant of the internal combustion engine, the pedal depression of the gas pedal 8 and the gear position of the automatic transmission. Then, step 310 stores data indicative of the coolant temperature of the coolant of the internal combustion engine, the pedal depression and the gear position of the automatic transmission, and data of the throttle aperture sent by the main CPU 20 in memory regions WT, WP, WG and WMS, respectively, of the work RAM region 32w. Memory regions WT, WP, WG and WMS are data regions of the work RAM region 32w in which data indicative of the coolant temperature is stored in memory region WT, data indicative of the amount of pedal depression of the gas pedal 8 is stored in memory region WP, data indicative of the gear position is stored in the memory region WG and data indicative of the throttle aperture sent by the main CPU 20 is stored in the memory region WMS.

Figure 5:
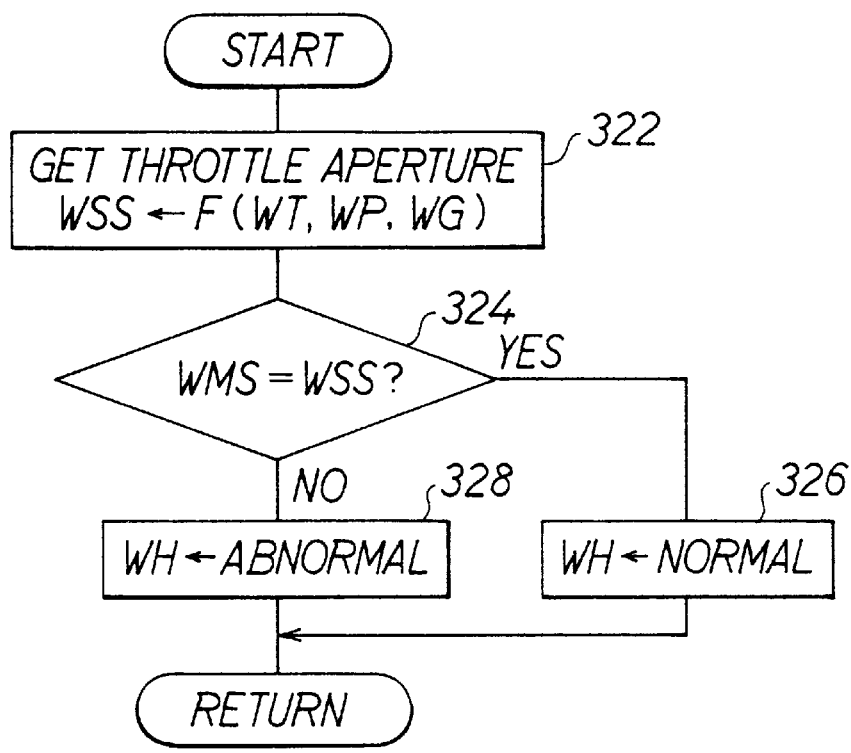
FIG. 5 is a flow chart of a subroutine of the main CPU monitoring process of the subordinate CPU in the first embodiment.

After step 310, control goes to step 320 which executes a monitoring subroutine shown in FIG. 5 for checking if the main CPU 20 is operating properly or not. After step 320 commences the execution of the monitoring subroutine, control goes to step 322. Based on data indicative of the coolant temperature, pedal depression and gear position and which are stored respectively in memory regions WT, WP and WG of the work RAM 32w, step 322 computes for the throttle aperture using the same function f used in step 120 of the main process of the main CPU 20 and stores the computed throttle aperture in a memory region WSS of the work RAM 32w.

Subsequent step 324 determines if the throttle aperture stored in the memory region WSS (that is, the throttle aperture computed by the subordinate CPU 30) and the throttle aperture stored in the memory region WMS (that is, the throttle aperture computed by the main CPU 20) are the same or not. If both throttle apertures are the same, that is, if step 324 gives a positive output, control goes to step 326 which stores data in the memory region WH of the work RAM 32w to indicate that the main CPU 20 is working properly. The execution of this monitoring subroutine terminates thereafter.

On the other hand, if step 324 determines that both throttle apertures are not the same, control goes to step 328 which stores data in the memory region WH of the work RAM 32w to indicate that the main CPU 20 is not working properly. The execution of this monitoring subroutine terminates thereafter.

After the execution of the monitoring subroutine of FIG. 5, control goes to step 330 which stores the throttle aperture stored in the memory region WSS of the work RAM 32w in a memory region CSS of the control data RAM 32c as a result of the execution of the monitoring subroutine of FIG. 5. The same step 330 also stores the data (hereinafter referred to as "determination result") stored in the memory region WH of the work RAM 32w in a memory region CH of the control data RAM 32c as another result of the execution of the monitoring subroutine of FIG. 5. The memory regions CSS and CH correspond to the first memory region in the appended claims.

After step 330, control goes to step 340 which determines if the determination result stored in the memory region CH of the control data RAM 32c indicates an abnormality or not. If the determination result indicates that there is no abnormality, the subordinate CPU 30 finishes the execution of the process of FIG. 4.

On the other hand, if step 340 gives a positive output, that is, if step 340 determines that the determination result stored in the memory region CH of the control data RAM 32c indicates an abnormality, control goes to step 350 which determines if step 340 has been consecutively giving a positive output for no less than a predetermined number of times. If step 350 gives a negative output, the subordinate CPU 30 finishes the execution of the process of FIG. 4. However, if step 350 determines that step 340 has been continuously giving a positive output for no less than the predetermined number of times, control goes to step 360 which sends the aforementioned control termination command to the main CPU 20. After the execution of step 360, the subordinate CPU 30 terminates the execution of the monitoring process of FIG. 4.

In other words, in this monitoring process of FIG. 4, the subordinate CPU 30 stores (in step 310) data indicative of the coolant temperature, pedal depression, gear position and the throttle aperture computed by the main CPU 20 in memory regions WT, WP, WG and WMS, respectively, of the work RAM 32w. Then, the subordinate CPU 30 calls (in step 320) the monitoring subroutine of FIG. 5 which computes the target throttle aperture in the same manner as the main CPU 20 and compares both throttle aperture values to determine if the main CPU 20 is working properly or not.

The subordinate CPU 30 then stores (instep 330) the results of the execution of the monitoring subroutine in the control data RAM 32c. That is, the subordinate CPU 30 stores the computed throttle aperture and the determination result in memory regions CSS and CH, respectively, of the control data RAM 32c. When the determination result that is stored in the memory region CH of the control data RAM 32c continuously indicates an abnormality for no less than the predetermined number of times (that is, both of steps 340 and 350 give positive outputs), the subordinate CPU 30 sends the control termination command to the main CPU 20 and thus, the main CPU 20 stops controlling the throttle valve 6 (in step 360).

After the execution of the process of FIG. 4, control goes to step 400 which executes the logic determination process of FIG. 5. In this logic determination process, step 410 retrieves the predetermined test data set stored in the ROM 28. Examples of such test data sets are shown in TABLES 1 and 2.

TABLE 1

TEST DATA SET #1

*TEST INPUT DATA

Test value 1:Coolant temperature = 40° C.
Test value 2:Pedal depression = 2.0 deg
Test value 3:Gear position = Parking
Test value 4:Main throttle aperture = 2.5 deg
*TARGET SUBROUTINE Monitoring subroutine
*REFERENCE DATA Reference value 1:Throttle aperture = 2.5 deg
Reference value 2:Determination result = normal

TABLE 2

TEST DATA SET #2

*TEST INPUT DATA

Test value 1:Coolant temperature = 60° C.
Test value 2:Pedal depression = 7.0 deg
Test value 3:Gear position = Third Gear
Test value 4:Main throttle aperture = 10.0 deg
*TARGET SUBROUTINE Monitoring subroutine
*REFERENCE DATA Referende value 1:Throttle aperture = 8.0 deg
Reference value 2:Determination result = abnormal These test data sets #1 and #2 are provided for checking if a target subroutine is being properly executed by the subordinate CPU 30 or not. As shown in TABLES 1 and 2, these test data sets #1 and #2 include test input data, data indicating the target subroutine and reference data which will be the resulting data when the target subroutine is properly executed based on the test input data.

Here, the present embodiment aims to check if the monitoring subroutine of FIG. 5, which is called from the monitoring process of FIG. 4, is being executed properly or not. In this connection, the target subroutine in the test data sets #1 and #2 shown in TABLES 1 and 2 is set to be the monitoring subroutine. Also, as the test input data, the coolant temperature data is set as the test value 1, pedal depression data is set as the test value 2 and gear position data is set as the test value 3. As reference data values, the target throttle aperture and the determination result are set in accordance with the test input data.

In the present embodiment, it must be noted that test data set #1 shown in TABLE 1 is provided for determining if step 324 properly gives the positive output and if step 326 is operating properly or not. On the other hand, the test data set #2 is provided for determining if step 324 properly gives the negative output and if step 328 is operating properly or not. These test data sets #1 and #2 are stored in the ROM 28 with both test data sets #1 and #2 being read in turn by step 410.

Figure 6:
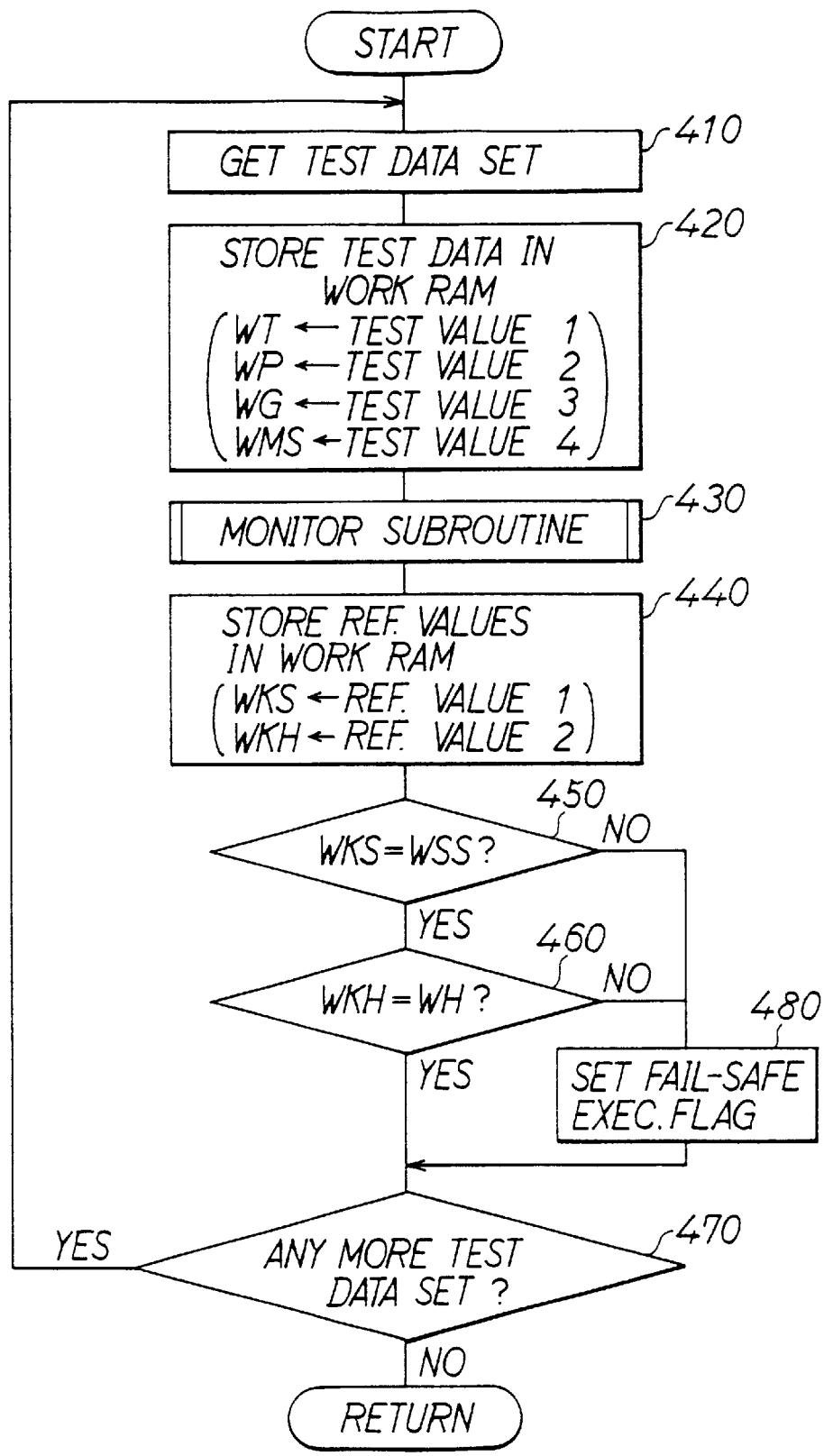
FIG. 6 is a flow chart of a logic determination process executed by the subordinate CPU in the first embodiment.

In the logic determination process of FIG. 6 called by step 400, step 410 reads one test data set. Subsequent step 420 stores test values 1, 2, 3 and 4 of the test data set in memory regions WT, WP, WG and WMS, respectively, of the work RAM 32w. Then, step 430 executes the routine indicated as the target subroutine in the test data set. In the present embodiment, the monitoring subroutine of steps 322–328 is designated as the target subroutine.

Thus, upon the commencement of the execution of the monitoring subroutine of FIG. 5, step 322 computes the throttle aperture based on test values 1, 2 and 3, which are stored in memory regions WT, WP and WG, respectively, of the work RAM 32w, and stores the computed throttle aperture in the memory region WSS of the work RAM 32w. Subsequent step 324 checks if the throttle aperture computed based on test values 1, 2 and 3 is the same as the test value 4 stored in the memory region WMS of the work RAM 32w. Control then goes to either step 326 or step 328 depending on the determination of step 324 with the determination result that indicates normality or abnormality being stored in the memory region WH of the work RAM 32w.

In this way, after the execution of the monitoring subroutine, control goes to step 440 which stores reference values 1 and 2 of the test data set read in step 410 in memory regions WKS and WKH, respectively, of the work RAM 32w.

Subsequent step 450 determines if the value stored in the memory region WKS (that is, the reference value of the throttle aperture) of the work RAM 32w and the value stored in memory region WSS (that is, the throttle aperture computed by step 322 of the monitoring subroutine based on test values 1, 2 and 3) of the work RAM 32w are the same or not. If step 450 determines that these values are the same, control goes to step 460.

Step 460 determines if the value stored in the memory region WKH (that is, the reference value of the determination result which indicates whether the main CPU 20 is operating properly or not) and the value stored in the memory region WH (that is, the determination result stored in the memory region WH in accordance with step 324 of the monitoring subroutine) are the same or not. If step 460 determines that these values are the same, control goes to step 470.

Step 470 determines if there are any remaining test data sets or not. When step 470 determines that there are remaining test data sets, control goes to step 410 which reads the next test data set. On the other hand, if step 470 determines that there are no more test data sets left, then the subordinate CPU 30 terminates the execution of this logic determination process.

Meanwhile, if step 450 determines that the values stored in memory regions WKS and WSS are not the same or if step 460 determines that the values stored in memory regions WKH, WH are not the same, the execution of the monitoring subroutine is considered to be improper and inaccurate and control goes to step 480. Step 480 sets a fail-safe execution flag in the control data RAM 32c. Thereafter, control goes to step 470. If there are remaining test data sets, control goes to step 410. On the other hand, if there are no more remaining test data sets, the subordinate CPU 30 terminates the execution of this logic determination process.

As shown in the subordinate CPU process of FIG. 3, after the execution of the logic determination process, control goes to step 500. Step 500 determines if the fail-safe execution flag is set or not. If step 500 determines that the fail-safe execution flag is not set, control goes back to step 300 which again executes the main CPU monitoring process. On the other hand, if step 500 determines that the fail-safe execution flag is set, control goes directly to step 600 which terminates the provision of the watchdog signal W/D2 at regular intervals to the monitor section 34. Accordingly, the monitor section 34 resets the subordinate CPU 30 by providing it with a reset signal RST2. After receiving the reset signal RST2 from the monitor section 34, the subordinate CPU 30 resumes its operations starting with the execution of step 200.

Details of how the logic determination process of FIG. 5 determines the execution condition of the monitoring subroutine of FIG. 4 are explained hereinafter. At the start of operations, step 410 of the logic determination process retrieves test data set #1 which is shown in TABLE 1.

Step 420 stores test value "40° C." of the coolant temperature in memory region WT of the work RAM 32w, stores test value "2.0 deg" of the pedal depression in the memory region WP of the work RAM 32w, stores test value "Parking" of the gear position of the automatic transmission in the memory region WG of the work RAM 32w and stores the test value "2.5 deg" of the throttle aperture in the memory region WMS of the work RAM 32w.

Here, with the reference value of the throttle aperture in the test data set #1 of TABLE 1 being set to "2.5 deg", both step 120 of the main CPU process and step 322 of the monitoring subroutine should derive the same throttle aperture value of 2.5 deg after entering the test value "40° C." of the coolant temperature, the test value "2.0 deg" of the pedal depression and the test value "Parking"of the gear position into the function f.

In this way, when step 430 calls the monitoring subroutine and if step 322 is properly executed, step 322 will store the throttle aperture value of 2.5 deg in the memory region WSS of the work RAM 32w. Moreover, if steps 324 and subsequent steps are also properly executed, with the throttle aperture of 2.5 deg being stored in the memory region WMS of the work RAM 32w, step 324 determines that the throttle aperture value stored in the memory region WSS of the work RAM 32w and the throttle aperture value stored in the memory region WMS of the work RAM 32w are the same. Thus, step 326 stores the determination result, which indicates that the main CPU 20 is working properly, in the memory region WH of the work RAM 32w.

Meanwhile, after the execution of the monitoring subroutine, control goes to step 440 which stores the reference value of the throttle aperture, which is 2.5 deg, in the memory region WKS of the work RAM 32w and stores the reference value of the determination result that indicates that the main CPU 20 is operating properly in the memory region WKH of the work RAM 32w.

Therefore, if all the steps of the monitoring subroutine are executed properly, step 450 of the logic determination process will determine that the throttle aperture value stored in memory region WKS (that is, the reference value of the throttle aperture) of the work RAM 32w and the throttle aperture value stored in the memory region WSS (that is, the throttle aperture value computed by step 322) of the work RAM 32w are the same. Moreover, step 460 will determine that the determination result stored in the memory region WKH (that is, the reference value of the determination result) of the work area RAM 32w and the determination result stored in the memory region WH (that is, the determination result stored by step 326 in the memory region WH after step 324 gives a positive output) of the work RAM 32w are the same. Accordingly, the logic determination process can determine if the monitoring subroutine is operating properly or not.

On the other hand, if the monitoring subroutine activated by step 322 is not properly executed, step 322 will not store the throttle aperture of 2.5 deg in the memory region WSS of the work RAM 32w and thus, step 450 of the logic determination process will not give a positive output. In addition, if step 326 is not properly executed, step 326 will not store the determination result which indicates that the main CPU 20 is operating properly in the memory region WH of the work RAM 32w and thus, step 460 will give a negative output.

When step 450 or 460 gives a negative output, the subordinate CPU 30 determines that the monitoring subroutine is not being properly executed and thus, step 480 sets the fail-safe execution flag. In this way, the monitor section 34 will reset the subordinate CPU 30.

In other words, the test input data of the test data set #1 are set so that step 324 gives a positive output and that steps along the control flow when step 324 gives a positive output are executed (that is, the flow of control from step 322 to step 324 (positive output) to step 326). Accordingly, when step 410 of the logic determination process reads the test data set #1, the logic determination process determines that the monitoring subroutine is working properly only when all of the steps along the aforementioned control flow are executed properly.

Next, the case when step 410 of the logic determination process reads the test data set #2 shown in Table2 is explained hereinafter. In this case, step 420 stores test value "60° C." of the coolant temperature in memory region WT of the work RAM 32w, stores test value "7.0 deg" of the pedal depression in the memory region WP of the work RAM 32w, stores test value "Third Gear", of the gear position of the automatic transmission in the memory region WG of the work RAM 32w and stores the test value "10.0 deg" of the throttle aperture in the memory region WMS of the work RAM 32w.

As shown in TABLE 2, the reference value of the threshold aperture is 8.0 deg. In this way, step 120 of the main CPU process and step 322 of the monitoring subroutine should compute the threshold value of 8.0 deg when the coolant temperature of 60° C., the pedal depression of 7.0 deg and the gear position of "Third Gear" are entered into the function f.

After the execution of step 420, control goes to step 430 which calls the monitoring subroutine. If the monitoring subroutine is properly executed, step 322 will store the throttle aperture of 8.0 deg in the memory region WSS of the work RAM 32c. Moreover, if steps 324 and subsequent steps are also properly executed, with the throttle aperture of 10.0 deg being stored in the memory region WMS of the work RAM 32w, step 324 determines that the throttle aperture value stored in the memory region wss of the work RAM 32w and the throttle aperture value stored in the memory region WMS of the work RAM 32w are not the same. Thus, step 326 stores the determination result, which indicates that the main CPU 20 is not operating properly, in the memory region WH of the work RAM 32w.

Meanwhile, after the execution of the monitoring subroutine, control goes to step 440 which stores the reference value of the throttle aperture, which is 8.0 deg, in the memory region WKS of the work RAM 32w and stores the reference value of the determination result that indicates that the main CPU 20 is not operating properly in the memory region WKH of the work RAM 32w.

Therefore, if all the steps of the monitoring subroutine are executed properly, step 450 of the logic determination process will determine that the throttle aperture value stored in memory region WKS (that is, 8.0 deg which is the reference value of the throttle aperture) of the work RAM 32w and the throttle aperture value stored in the memory region WSS (that is, 8.0 deg which is the throttle aperture value computed by step 322) of the work RAM 32w are the same. Moreover, step 460 will determine that the determination result stored in the memory region WKH (that is, the reference value of the determination result which indicates an abnormality) of the work area RAM 32w and the determination result stored in the memory region WH (that is, the determination result that indicates an abnormality and that is stored by step 328 in the memory region WH after step 324 gives a negative output) of the work RAM 32w are the same. Accordingly, the logic determination process can determine if the monitoring subroutine is being properly executed or not.

On the other hand, if the monitoring subroutine activated by step 322 is not properly executed, step 322 will not store the throttle aperture of 8.0 deg in the memory region WSS of the work RAM 32w and thus, step 450 of the logic determination process will give a negative output. In addition, even if step 322 is executed properly, if step 324 does not properly give a negative output or if step 328 is not properly executed, step 328 will not store the determination result which indicates that the main CPU 20 is not operating properly in the memory region WH of the work RAM 32w and thus, step 460 will give a negative output.

In the same way as the case of the test data set #1, if one of steps 450 or 460 gives a negative output, the subordinate CPU 30 determines that the monitoring subroutine is not operating properly and thus, step 480 sets the fail-safe execution flag. Accordingly, the monitor section 34 resets the subordinate CPU 30.

In other words, the test input data of the test data set #2 are set so that step 324 gives a negative output and that steps along the control flow when step 324 gives a negative output are executed (that is, the flow of control from step 322 to step 324 (negative output) to step 328). Accordingly, when step 410 of 32 the logic determination process reads the test data set #2, the logic determination process determines that the monitoring subroutine is working properly only when all of the steps along the aforementioned control flow are executed properly.

Thus, because step 410 of the logic determination process reads both the test data set #1 and the test data set #2, the logic determination process can check all steps and all flows of control in the monitoring subroutine.

In the present embodiment, the monitoring subroutine (steps 322–328) stored in the ROM 28 and the subordinate CPU 30 correspond to the processing unit in the claims, steps 310, 320 and 330 of the monitoring process executed by the subordinate CPU 30 correspond to the activation unit in the claims and steps 340, 350 and 360 of the monitoring process executed by the subordinate CPU 30 correspond to the signal generation unit in the claims. Furthermore, the ROM 28, which contains the test data sets #1 and #2, corresponds to the test data memory unit in the claims and the logic determination process (steps 410–480) executed by the subordinate CPU 30 and steps 500 and 600 of the subordinate CPU process correspond to the check unit.

As explained above, the control system 2 according to the present embodiment includes the main CPU 20 that actually controls the internal combustion engine and the subordinate CPU 30 that executes the monitoring subroutine to check if the main CPU 20 is operating properly or not. The subordinate CPU 30 sends the control termination command to the main CPU 20 when it determines that the main CPU 20 is not operating properly to prevent erroneous control operations of the main CPU 20.

In addition, in the control system 2 according to the present embodiment, the ROM 28 stores the test data (that is, test input data of the coolant temperature, pedal depression, gear position and the main CPU throttle aperture) to be used by the subordinate CPU 30 during the execution of the monitoring subroutine and the reference data that should be obtained when the monitoring subroutine is properly executed based on the aforementioned test input data as test data sets #1 and #2. In this regard, in the logic determination process which the subordinate CPU 30 executes alternately with the monitoring process, the subordinate CPU 30 stores (in step 420) the test values in the memory regions WT, WP, WG and WMS of the work RAM 32w, calls the monitoring subroutine (in step 430) and determines that the monitoring subroutine is not being executed properly when the processing results of the monitoring subroutine and the reference data are not the same (that is, steps 450 or 460 give negative outputs).

Thus, according to the control system 2 of the present embodiment, because the operation of the monitoring subroutine can be checked by actually executing the same monitoring subroutine, the control system 2 can reliably determine that the monitoring subroutine for monitoring the main CPU 20 is not operating properly when there are errors in the program and data in the ROM 28 and when there is an abnormality in the operations of the subordinate CPU 30.

When the subordinate CPU 30 determines that the monitoring subroutine is not being properly executed, the subordinate CPU 30 terminates the main CPU monitoring process to prevent the transmission of the control termination command to the main CPU 20 and stops the generation of the watchdog pulse W/D2 so that it will be reset by the monitor section 34.

Accordingly, the control system 2 of the present embodiment prevents the erroneous transmission of the control termination command to the main CPU 20 when the main CPU 20 is operating properly. In this way, operations for monitoring the main CPU 20 can be performed reliably.

Meanwhile, the monitoring process performed by the subordinate CPU 30 stores (in step 330) the throttle aperture computed by the monitoring subroutine and the determination result determined by the same monitoring subroutine in memory regions CSS and CH, respectively, of the control data RAM 32c (which is separate from the work RAM 32w). Based on the determination result stored in memory region CH of the control data RAM 32c, the subordinate CPU 30 determines (in steps 340 and 350) whether or not the control termination command should be sent to the main CPU 20.

With the subordinate CPU 30 of the present embodiment, the control termination command to the main CPU 20 is transmitted based only on input data received from the outside by the input circuit 16 and thus, the execution of the monitoring subroutine based on the test input data will not affect the transmission of the control termination command to the main CPU 20. In addition, when controlling other processes based on the throttle aperture stored in the memory region CSS of the control data RAM 32c, such control operations will be performed based solely on input data received from the outside by the input circuit 16. In this way, the execution of the monitoring subroutine using test input data will not affect such control operations.

Moreover, two types of test data sets are stored in the ROM 28, that is, the test data set #1 which includes the test input data for enabling the execution of the control flow in the monitoring subroutine for the casewhen step 324 gives the positive output and the test data set #2 which includes the test input data for enabling the execution of the control flow in the monitoring subroutine for the case when step 324 gives the negative output. In this way, all steps of the monitoring subroutine can be checked and thus, more reliable monitoring operations can be performed.

Furthermore, because the subordinate CPU 30 of the present embodiment executes the logic determination process at predetermined time intervals, program and data errors in the monitoring subroutine and errors in the operations of the subordinate CPU 30 can be reliably detected.

While the present embodiment checks the execution condition of the monitoring subroutine which monitors the main CPU 20, other subroutines might also be set as target subroutines for checking by the logic determination process.

Moreover, the main CPU 20 may employ a routine similar to the logic determination process of FIG. 6 to check its subroutines that are used for controlling various devices. In this way, the main CPU 20 can reliably detect if its subroutines are working properly or not and thus, the main CPU 20 can vastly improve the reliability of its control operations.

In addition, if a particular subroutine that is being checked is very vital in performing control operations, the logic determination process can be executed by the main CPU 20 or the subordinate CPU 30 immediately after being reset or actuated. In this way, erroneous control operations can be prevented beforehand.

While step 450 of FIG. 5 checks if the throttle aperture computed based on the test input data (the throttle aperture value stored in the memory region WSS) and the reference throttle aperture value (the throttle aperture value stored in the memory region WKS) are exactly the same, in consideration of computational errors, step 450 may be arranged to determine if the difference between both threshold values is less than a predetermined value or not.

Figure 7:
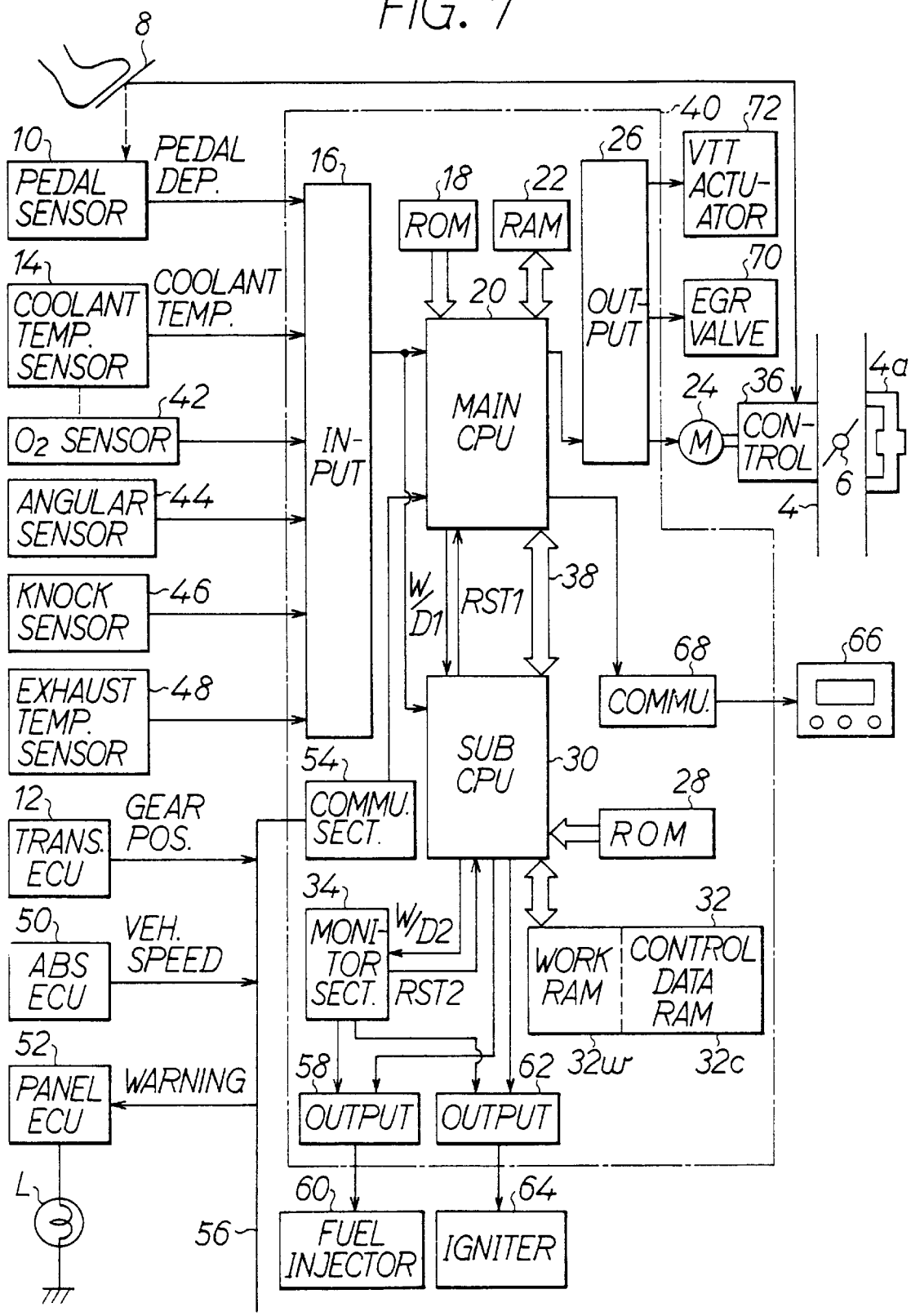
FIG. 7 is a schematic diagram of the engine control system and its peripheral devices according to a second preferred embodiment of the present invention.

The engine control system 40 according to a second embodiment of the present invention and related devices are explained hereinafter with reference to FIG. 7. Differences in the constructions between the engine control system 40 according to the second embodiment and the engine control system 2 according to the first embodiment are listed below.

1. Aside from the pedal depression sensor 10 and the coolant temperature sensor 14, the input circuit 16 receives signals from an oxygen sensor 42, an angular sensor 44, a knock sensor 46, an exhaust air temperature sensor 48 and the like. The oxygen sensor 42 is provided along an exhaust air pipe of the internal combustion engine. The angular sensor 44 generates pulse signals for every predetermined angle of rotation of a crank shaft of the internal combustion engine. The knock sensor 46 detects knocking in the internal combustion engine. The exhaust air temperature sensor 48 detects the temperature of the exhaust air of the internal combustion engine. It must be noted here that the input circuit 16 provides these signals to both the main CPU 20 and the subordinate CPU 30 in the same way as in the first embodiment.

2. The engine control system 2 according to the present embodiment is provided with a transmission ECU 12, an anti-skid control ECU 50 (hereinafter referred to as "ABS ECU"), a control panel ECU 52 and a communication section 54. The ABS ECU 50 performs anti-skid brake control operations. The control panel ECU 52 controls the various instruments and display units in the instrument panel of the passenger compartment. The communication section 54 is for facilitating communication operations with other electronic control devices. This communication section 54 is connected to the other electronic control devices via a communication line 56 which forms a LAN inside the vehicle. Data obtained by the main CPU 20 during communication operations with the other electronic control devices via the communication section 54 is also provided to the subordinate CPU 30 via the serial communication line 38.

3. The subordinate CPU 30 of the present embodiment not only checks if the main CPU 20 is working properly or not but also performs fuel injection and ignition control operations on the internal combustion engine. In this way, the control system 40 is provided with output circuits 58 and 62. The output circuit 58 controls a fuel injection device 60 (which may be an injector or the like) in accordance with fuel injection commands from the subordinate CPU 30. The output circuit 62 controls an ignition device (which may be an igniter or the like) in accordance with ignition commands from the subordinate CPU 30.

4. The monitor section 34 not only monitors the watchdog signal W/D2 from the subordinate CPU 30 but also performs backup operations to provide predetermined fuel injection and ignition commands to both output circuits 58 and 62 in place of the subordinate CPU 30 when the subordinate CPU 30 stops generating the watchdog signal W/D2. This arrangement ensures that the vehicle can at least be driven even if the subordinate CPU 30 is not operating properly.

5. The control system 40 of the present embodiment is provided with a communication circuit 68 which facilitates communication operations with a detachable diagnostic device 66. This diagnostic device 66 performs diagnostic operations to check for any abnormality in the control system 40.

6. A bypass path 4a is provided in the intake air assembly 4 of the internal combustion engine. This bypass path 4a ensures that the internal combustion engine is always provided with a predetermined amount of air. Thus, the provision of the bypass assembly ensures the continuous operation of the internal combustion engine even if the throttle valve 6 is inadvertently closed.

7. Among the output ports of the subordinate CPU 30, the output port that provides the reset signal RST1 to the main CPU 20 is set to the level for resetting the main CPU 20 when the subordinate CPU 30 receives the reset signal RST2 from the monitor section 34. In this way, the main CPU 20 is also reset when the subordinate CPU 30 is reset.

In the control system 40 according to the present embodiment, the main CPU 20 performs auxiliary control operations for improving the driving and safety performance of the vehicle while the subordinate CPU 30 performs the basic operation of controlling the movement of the vehicle. Details of the control operations performed by the main CPU 20 and the subordinate CPU 30 are explained hereinafter.

Aside from controlling the aperture of the throttle valve 6 based on the coolant temperature of the internal combustion engine, the amount of pedal depression and the gear position of the automatic transmission through the execution of the main CPU process shown in FIG. 2, the main CPU 20 performs idle speed control (ISC) operations for setting the idle rotation speed of the internal combustion engine to an optimal amount when the amount of pedal depression is zero, that is, when the gas pedal 8 is not being depressed.

Moreover, aside from receiving gear-related data such as gear position data of the automatic transmission from the transmission ECU 12 via the communication line 56 and the communication section 54, the main CPU 20 receives vehicle speed information from the ABS ECU 50. Based on such vehicle speed information, the main CPU 20 performs traction control operations for controlling the throttle valve 6 so that there will be an appropriate amount of engine torque in accordance with the driving condition of the vehicle.

Furthermore, when an auto cruise control switch (not shown) is actuated, the main CPU 20 performs auto cruise control operations based on vehicle speed information from the ABS ECU 50 for setting the actual speed of vehicle to a target speed set by a driver of the vehicle.

In addition, aside from controlling the throttle valve 6, the main CPU 20 performs communication control operations, EGR (exhaust gas recirculation) control operations, VVT (variable valve timing) control operations and a diagnostic process. The main CPU 20 performs the communication control operations for communicating with electronic control devices such as the transmission ECU 12 or the like. The main CPU 20 performs the EGR control operations for recirculating the exhaust gas of the internal combustion engine back to the intake air assembly 4 to reduce the amount of NOx emissions. In this EGR control, the main CPU 20 opens an EGR valve provided in a path connecting the exhaust path of the internal combustion engine with the intake air assembly 4 when a predetermined condition is satisfied. The main CPU 20 performs the VVT control operations for controlling the timing for opening and closing intake and exhaust valves to effectively generate torque outputs during the entire rotation of the internal combustion engine. While the main CPU 20 drives a VTT actuator 72 during the performance of VVT control operations, a mechanical system (not shown) is arranged to control the timing for opening and closing the intake and exhaust valves to ensure that the movement of the vehicle is not hampered when the VVT control operation of the main CPU 20 stops for some reason. In the aforementioned diagnostic process, the main CPU 20 checks for any abnormality in the conditions of the various parts of the vehicle based on sensor signals from the various sensors and data from the subordinate CPU 30, stores data regarding such abnormality and sends such stored data to the diagnostic device 66 via the communication circuit 68 when the diagnostic device is coupled to the control system 2.

Meanwhile, when the main CPU 20 stops executing control operations over the throttle valve 6 after receiving the control termination command from the subordinate CPU 30, the main CPU 20 sends a warning signal to the control panel ECU 52 via the communication. section 54 and the communication line 56. Upon receipt of the warning signal, the control panel ECU 52 actuates a warning lamp L to inform the driver of the vehicle of an abnormality in the main CPU 20.

Figure 8:
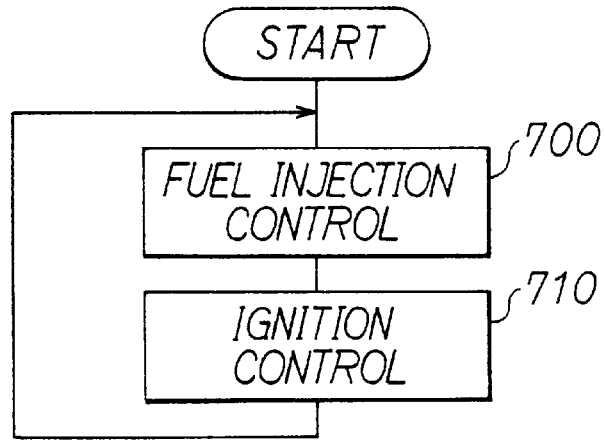
FIG. 8 is a flow chart of a basic engine control process executed by the subordinate CPU in the second embodiment.

By the way, as shown in FIG. 8, the subordinate CPU 30 performs fuel injection control and ignition control of the internal combustion engine through the repeated execution of the normal fuel injection control operation (step 700) and the ignition control operation (step 710). The subordinate CPU 30 also performs a knock control operation in which the subordinate CPU 30 detects knocking in the internal combustion engine based on signals from the knock sensor 46 and adjusts the ignition timing based on the detected result to reduce knocking in the internal combustion engine. Together with the aforementioned control operations, the subordinate CPU 30 executes the process for monitoring the operations of the main CPU 20 based on the presence/absence of the watchdog signal W/D1 and the process of FIG. 3 described in the first embodiment and which calls the routines of FIGS. 4–6.

Moreover, the subordinate CPU 30 according to the second embodiment of the present invention also performs a routine similar to that of FIG. 3 for checking the traction control and auto cruise control routines performed by the main CPU 20.

In other words, the subordinate CPU 30 performs a first monitoring process (hereinafter referred to as monitoring process A), a second monitoring process (hereinafter referred to as monitoring process B), a first logic determination process (hereinafter referred to as logic determination process A) and a second logic determination process (hereinafter referred to as logic determination process B). The subordinate CPU 30 executes the monitoring process A, which is similar to the process of FIG. 4, to check if the main CPU 20 is properly executing the traction control process or not. The subordinate CPU 30 also executes the logic determination process A, which is similar to the process of FIG. 5, to check if the subordinate CPU 30 itself is properly executing the monitoring process A. Furthermore, the subordinate CPU 30 executes the monitoring process B, which is similar to the process of FIG. 4, to check if the main CPU 20 is properly executing the auto cruise control process or not. In this connection, the subordinate CPU 30 also executes the logic determination process B, which is similar to the process of FIG. 5, to check if the subordinate CPU 30 itself is properly executing the monitoring process B. In the same way as the process of FIG. 4, when one of the monitoring processes A and B determines that there is an abnormality in the control process being performed by the main CPU 20, the subordinate CPU 30 sends a control termination command to the main CPU 20 to terminate control operations on the throttle valve 6. Furthermore, in the same way as the process of FIG. 4 when one of the logic determination processes A and B determines that the respective monitoring processes A and B is not operating properly, the subordinate CPU 30 stops providing the watchdog signal W/D2 to the monitor section 34 to indicate that there is an abnormality in the subordinate CPU 30 itself.

As explained above, in the control system 40 of the present embodiment, the main CPU 20 performs control operations on the throttle valve 6 that demand a high level of security and reliability, and auxiliary control operations such as communication control operations with the other electronic control systems, EGR control, VVT control and diagnostic control operations. In this control system 40 of the present invention, fail-safe mechanisms are provided to ensure that there will be no significant obstacles in the performance and operation of the vehicle when the operations of the main CPU 20 are terminated.

For example, even if the main CPU 20 terminates its control operations on the throttle valve 6, the mechanism of the aperture controller 36 takes over to control the opening and closing of the throttle valve 6 in accordance with the depression of the gad pedal 8. Also, even if the gas pedal is not being depressed, the provision of the bypass path 4a in the intake air assembly 4 enables the idle driving of the internal combustion engine. Moreover, as explained above, even if the main CPU 20 stops executing the VVT control operation, a prescribed mechanism (not shown) sets the timing for opening and closing the intake and exhaust valves to basically ensure the continuous operation of the vehicle.

Moreover, in the control system 40 according to the present embodiment, the subordinate CPU 30, which monitors the operations of the main CPU 20, performs fuel injection and ignition control processes which are vital to the operation of the internal combustion engine. As backup, the monitor section 34, which monitors the operations of the subordinate CPU 30, generates predetermined fuel injection and ignition commands to the output circuits 58 and 62, respectively, when there is an abnormality in the operation of the subordinate CPU 30 to ensure the basic operation of the internal combustion engine.

Furthermore, in the control system according to the present embodiment, when the main CPU 20 stops providing the watchdog signal W/D1 to the subordinate CPU 30, the subordinate CPU 30 sends the reset signal RST1 to reset the main CPU 20. In addition, when the subordinate CPU 30 stops providing the watchdog signal W/D2 to the monitor section 34, the monitor section 34 sends the reset signal RST2 to the subordinate CPU 30 to reset the same. As explained before, the main CPU 20 also resets when the subordinate CPU 30 is reset.

In other words, because of the high level of security and reliability demanded for the control operation on the throttle valve 6, the main CPU 20 is also reset together with the subordinate CPU 30 when there is an abnormality in the subordinate CPU 30 that is monitoring the main CPU 20 (which is performing the control operation on the throttle valve 6). To put it in another way, main priority is placed here on security and reliability and thus, the main CPU 20 is reset even if there is but a slight abnormality in the control system 40.

As explained before, in the control system 40 according to the present embodiment, the provision of the aperture controller 36 and the bypass path 4a in the intake air assembly 4 facilitates air intake even if the main CPU 20 stops controlling the throttle valve 6. In addition, the monitor section 34 ensures the basic operation of the internal combustion engine even during an abnormality in the operation of the subordinate CPU 30.

Therefore, the control system 40 according to the present embodiment highly satisfies both requirements for security and reliability against abnormalities and for facilitating basic operations of the internal combustion engine (that is, the operation of the vehicle).

In other words, in the present embodiment wherein a plurality of processing units, namely, the main CPU 20, the subordinate CPU 30 and the monitor section 34, are connected in series, the preceding units are being monitored by subsequent units. In this arrangement, when a particular unit detects an abnormality in an immediately preceding unit, all units preceding the particular unit are reset. Thus, in the present embodiment, the process for controlling the throttle valve 6, which demands a high level of security, is performed by the main CPU 20, which is at the very front position in such series of processing units, and the necessary control processes for driving the internal combustion engine are performed by subsequent units. In this way, both requirements of security and reliability despite the presence of abnormalities and for assuring the very basic operations of the vehicle can be satisfied.

In particular, in the control system 40 according to the present embodiment, the logic determination process of FIG. 6 executed by the subordinate CPU 30 reliably determines any abnormality in the control system 40 (in particular, abnormality in the subordinate CPU 30 as in the case of the present embodiment) and thus, the security and reliability of control processes for controlling the internal combustion engine can be further enhanced.

Furthermore, in the control system 40 according to the present embodiment, the subordinate CPU 30 executes monitoring processes A and B to determine if the main CPU 20 is properly controlling the throttle valve 6 or not. When the subordinate CPU 30 determines such abnormality, it sends a control termination command to the main CPU 20 to terminate only the control operation on the throttle valve 6. Despite the termination of the control operation on the throttle valve 6, the main CPU 20 continues to execute its other processes such as the communication process and the EGR process and thus, security and reliability of the control system 40 is further enhanced.

In the present embodiment, it must be noted that the main CPU 20 corresponds to the first processor in the appended claims, the subordinate CPU 30 corresponds to the second processor in the appended claims, the monitor section 34 corresponds to the third processor in the appended claims and the mechanism of the aperture controller 36 and the bypass path 4a of the intake air assembly 4 correspond to the fail-safe unit in the appended claims.

Moreover, step 360 of the monitoring process of FIG. 4 corresponds to the control termination unit while all steps of FIG. 4 excluding step 360 correspond to the check unit in the appended claims.

Although the present invention has been fully described in connection with preferred embodiments thereof with reference to the accompanying drawings, it is to be noted that various changes and modifications will become apparent to those skilled in the art.

Even if the throttle aperture values determined by step 120 of the process shown in FIG. 2 and step 322 of the process shown in FIG. 4 are the same, the control systems 2 and 40 of the respective first and second embodiments may be made to determine that there is an abnormality in the throttle aperture value when the computed throttle aperture value is determined to be inappropriate. For example, if the function f being used by both the main CPU 20 and the subordinate CPU 30 for computing the throttle aperture value is erroneous, such error can be detected by the logic determination process based on the test input data and the reference values.

While the logic determination process checks the monitoring subroutine which monitors if the main CPU 20 is operating properly or not, it goes without saying that the logic determination process may also check other processes. Furthermore, in monitoring the execution of a predetermined process by the main CPU 20, the main CPU 20 itself may execute a determination process similar to the logic determination process of FIG. 6. In this case, if such a determination process detects an abnormality, the main CPU 20 may stop providing the subordinate CPU 30 with the watchdog signal W/D1 to inform the subordinate CPU 30 of an abnormality in the main CPU 20.

Such changes and modifications are to be understood as being within the scope of the present invention as defined by the appended claims.

What is claimed is:

1. A control system comprising:

a parameter data memory unit for storing parameter data;

a processing unit for executing a predetermined process based on said parameter data stored in said parameter data memory unit;

an activation unit for receiving external data, storing said external data in said parameter data memory unit as said parameter data and activating said processing unit;

a test control unit for controlling a target device based on said external data;

a signal generation unit for providing a control signal to said control unit based on a processing result of said predetermined process executed by said processing unit when said processing unit is activated by said activation unit;

a test data memory unit for storing test data, said test data including test input data and reference data indicative of corresponding processing result when said processing unit executes said predetermined process based on said test input data; and a check unit for reading said test data from said test data memory unit, storing said test data as said parameter data in said parameter data memory unit, activating said processing unit to execute said predetermined process based on said test input data unless said activation unit is activating said processing unit and for determining that there is an abnormality in said processing unit when said processing result of said processing unit based on said test input data is different from said reference data.

2. A control system according to claim 1, wherein:

said parameter data memory unit is further for storing said processing result of said processing unit, said parameter data memory unit including a first memory region and a second memory region that is distinct from said first memory region, said parameter data memory unit storing said processing result of said processing unit in said first memory region when said processing unit is activated by said activation unit, said parameter data memory unit storing said processing result of said processing unit in said second memory region when said processing unit is activated by said check unit; and said signal generation unit is for generating said control signal based on said processing result stored in said first memory region.

3. A control system according to claim 1, wherein said control unit is for controlling said target device based on said external data stored in said parameter data memory unit.

4. A control system according to claim 1, wherein:

said parameter data memory unit is further for storing said processing result of said processing unit, said parameter data memory unit including a first memory region and a second memory region that is distinct from said first memory region, said parameter data memory unit storing said processing result of said processing unit in said first memory region when said processing unit is activated by said activation unit, said parameter data memory unit storing said parameter data and said processing result of said processing unit in said second memory region when said processing unit is activated by said check unit; and said control unit is for controlling said target device based on said parameter data stored in said second memory region of said parameter data memory unit.

5. A control system according to claim 1, wherein:

said processing unit is for executing all steps of said predetermined process based on said test input data when said check unit activates said processing unit; and said check unit is for reading said test data as a set, activating said processing unit based on said respective set of data and determining that there is an abnormality in said processing unit when said processing result of said predetermined process executed by said processing unit is different from said reference data in said set of data.

6. A control system according to claim 1, wherein said check unit is for activating said processing unit at a predetermined time interval.

7. A control system according to claim 1, wherein:

said processing unit is for executing said predetermined process to monitor if there is an abnormality in the control operation of said control unit; and said signal generation unit is for generating said control signal to set said control unit to an abnormal operation mode when said processing unit determines that there is an abnormality in said control operation of said control unit.

8. A control system according to claim 1, wherein:

said processing unit is for executing said predetermined process to monitor if there is an abnormality in said control unit; and said signal generation unit is for setting said control unit to an abnormal operation mode to inhibit said control unit from controlling said target device when said processing unit determines that there is an abnormality in said control unit.

9. A control system according to claim 1, wherein:

said control unit is for controlling said target device based on a first target value, said control unit using a predetermined procedure to compute said first target value based on said external data;

said processing unit is further for computing a second target value based on said external data and using said predetermined procedure of said control unit, performing a determination process to determine if there is an abnormality in said control unit, determining that there is an abnormality in said control unit when said second target value is different from said first target value and generating a determination result indicative of result of said determination process;

said test data memory unit is for storing reference data which includes reference computed data and reference determination data;

said check unit is for determining that there is an abnormality in said processing unit when said second target value is different from said reference computed data; and said check unit also is for determining that there is an abnormality in said processing unit when said determination result is different from said reference determination data.

10. A control system comprising:

a data reception unit for receiving external data;

a processing unit for executing a predetermined process for monitoring a control device based on said external data, said control device being for controlling a target device;

a signal generation unit for generating a control signal to said control device for setting said control device to an abnormal activation mode when a processing result of said predetermined process executed by said processing unit indicates that there is an abnormality in said control device; and a check unit for determining if there is an abnormality in said processing unit and terminating operations of said signal generation unit after determining that there is an abnormality in said processing unit.

11. A control system comprising:

control means for calculating control data based on input external data, and for controlling a target device by outputting control signals corresponding to said input external data;

first monitoring means for calculating determination data based on said input external data and said control data, for determining an abnormality in said control means by comparing said determination data with said control data, and for inhibiting said control means from controlling the target device when there is an abnormality in said control means; and second monitoring means provided independently from said first monitoring means for determining an abnormality in said first monitoring means based only on predetermined test data output from said first monitoring means, and for inhibiting said control means from controlling said target device when there is an abnormality in said first monitoring means.

12. A method of controlling a system while also monitoring for abnormalities in the system operation, said method comprising:

storing parameter data;

executing a predetermined control process based on said stored parameter data;

receiving external data and storing it as said parameter data and performing said executing step based thereon;

controlling a target device based on said external data;

providing a control signal based on the result of said executing step;

storing test data, said test data including test input data and reference data indicative of corresponding result of said executing step based on said test input data;

reading said stored test data and performing said executing step based on said test input data when time permits so as to determine whether there is an abnormality in said executing step when the results from said test input data is different from said reference data;

said target device being controlled based on a first target value using a predetermined procedure to compute said first target value based on said external data;

a second target value being computed based on said external data using said predetermined procedure and a determination process being performed to determine if there is an abnormality when said second target value is different from said first target value and a determination result is generated indicative of result of said determination process;

storing reference data which includes reference computed data and reference determination data;

determining that there is an abnormality when said second target value is different from said reference computed data; and determining that there is an abnormality when said determination result is different from said reference determination data.

13. A method for controlling a system while also monitoring for abnormalities in the system operation, said method comprising:

receiving external data;

executing a predetermined process for monitoring a control device based on said external data, said control device controlling a target device;

generating a control signal to said control device for setting said control device to an abnormal activation mode when a result of said predetermined process indicates that there is an abnormality in said control device; and determining if there is an abnormality in said processing unit and terminating said control signal after determining that there is an abnormality in said executing step.

* * * * *